United States Patent
Manning

[11] Patent Number: 5,649,384
[45] Date of Patent: Jul. 22, 1997

[54] FISH LURE

[76] Inventor: Hain Manning, HC 58, Box 26, Thedford, Nebr. 69166

[21] Appl. No.: 610,266

[22] Filed: Mar. 4, 1996

[51] Int. Cl.[6] .................................................. A01K 85/16
[52] U.S. Cl. ........................ 43/44.81; 43/42.39; 43/42.37
[58] Field of Search .............................. 43/44.81, 42.37, 43/42.39, 42.45, 42.24; D22/126

[56] References Cited

U.S. PATENT DOCUMENTS

| | | | |
|---|---|---|---|
| 2,989,817 | 6/1961 | Kepler | 43/44.81 |
| 3,352,051 | 11/1967 | Stewart, III | 43/42.1 |
| 3,693,275 | 9/1972 | Craig | 43/15 |
| 3,696,547 | 10/1972 | Cauquis | 43/42.39 |
| 3,742,639 | 7/1973 | Butts | 43/42.39 |
| 3,748,773 | 7/1973 | Goforth | 43/42.1 |
| 3,955,304 | 5/1976 | Reid | 43/42.28 |
| 3,959,912 | 6/1976 | Lee | 43/42.02 |
| 3,969,840 | 7/1976 | Charron | 43/42.06 |
| 3,979,853 | 9/1976 | Storm et al. | 43/42.29 |
| 3,981,096 | 9/1976 | Toivonen | 43/42.39 |
| 4,662,100 | 5/1987 | Yarusso | 43/42.37 |
| 4,823,502 | 4/1989 | Tucker | 43/42.37 |
| 4,864,766 | 9/1989 | Bohn | 43/42.39 |
| 5,231,786 | 8/1993 | Hughes | 43/42.81 |
| 5,245,782 | 9/1993 | Pahle | 43/42.37 |
| 5,261,182 | 11/1993 | Link | 43/42.37 |
| 5,564,220 | 10/1996 | Blicha | 43/42.39 |

*Primary Examiner*—Jeanne Elpel
*Attorney, Agent, or Firm*—Vincent L. Carney

[57] ABSTRACT

A weighted jig fish lure includes a combination hook and orientation device and plastic bait. The combination hook and orientation device includes a lead head with an eyelet to which a fishing line may be attached, a bait attachment mechanism and a fish hook molded in the lead. The weighted orientation device is attached to and positioned with respect to the hook to cause the hook to point forward, below the shank of the hook to hook the fish in the lower jaw. The eyelet and bait attachment mechanism are formed of loops of wire molded in the lead head. The wire is continuous and passes through the eyelet of the fish hook.

11 Claims, 2 Drawing Sheets

5,649,384

FISH LURE

BACKGROUND OF THE INVENTION

This invention relates to fish lures and methods of making and using them.

In one class of fish lures, the forward part of the lure is molded of a material heavier than water, such as for example, lead. This gives the lure sufficient weight to sink into the water, thus holding the hook and bait below the surface of the water where it may be swallowed by fish.

Plastic bait threaded onto the shank of the hook may be used to simulate the food commonly consumed by fish, with the hook protruding from the rear of the lure. When a fish consumes the simulated bait, the hook directs the point of the hook into the fish's mouth as the fish bites the lure.

In prior art lures of this class, the point of the fish hook extends outside of the bait with the hook curving upwardly toward the surface of the water and the point directed forwardly. In this arrangement, the point of the hook is above the shank of the hook, thus positioning the point of the hook toward the upper portion of a fish's mouth.

This prior art type of lure has several disadvantages such as for example: (1) the point of the hook is more likely to catch in weeds or the like; (2) it usually penetrates the upper lip of the fish, causing irrepairable damage to the fish or lodging between the upper lip and the roof of the fish's mouth; and (3) survivability of a fish caught in a "catch and release" mode of fishing is decreased due the to the damage caused by the penetration of the hook.

Another type of prior art lure is designed for planing along the surface of the water and making excursions to attract fish. It may have a hook in which the point is below the shank of the hook but is not designed to act as a weighted jig and are lighter and shaped to plan along the surface rather than rise and fall. Examples of this type of lure are shown in U.S. Pat. Nos. 3,861,075 and 3,942,281.

Other types of prior art lures include a skirt or flexible body connecting the hook. These lures tend to be expensive and fragile and may not attract the same fish as a weighted jig. Examples of this type of lure are described in U.S. Pat. Nos. 5,261,183 and 3,965,606.

SUMMARY OF THE INVENTION

Accordingly, it is an object of the invention to provide a novel weighted jig.

It is a further object of the invention to provide a novel lure.

It is a still further object of the invention to provide a novel method of making a lure.

It is a still further object of the invention to provide a novel combination hook and orientation device.

It is still another object of the invention to provide a novel head orientation device that contains an eyelet for the attachment of a fishing line, a bait attachment mechanism and a fish hook.

It is still another object of the invention to provide a novel weighted lure with a fish hook that contains a point below the shank of the fish hook.

It is still another object of the invention to provide a novel weighted jig with a combination hook and orientation device wherein a fish is hooked in the lower portion of the mouth, thus increasing the survivability of the fish and reducing damage to the fish.

In accordance with the above and further objects of the invention, a weighted jig includes a combination hook and orientation device and bait. The combination hook and orientation device includes a weighted orientation device, an eyelet to which a fishing line may be attached, a bait attachment mechanism and a fish hook. The weighted orientation device is attached to and positioned with respect to the hook to cause the point of the hook to be below the shank and to point forwardly. The eyelet and bait attachment mechanism are attached to the combination hook and weighted orientation device.

The orientation device is shaped as a horizontal pyramid, pointing forwardly with a rounded point at the front end, rounded edges and a wide base facing back toward the point of the hook. In the preferred embodiment it is molded of lead, which gives the combination hook and orientation device a higher density than water. The density is sufficiently dense to cause the entire lure to sink below the surface of the water.

An eyelet is positioned near the center of the top edge of the head orientation device and is adapted to be attached to a fishing line which in turn may be attached to the fishing reel. The eyelet is of sufficient size to thread a 0.025" to 0.040" fishing line through the eyelet.

In the preferred embodiment, the bait attachment mechanism is an eyelet located below the center of the rear of the head orientation device. This attachment eyelet is used used to attach plastic bait or the like to lure the fish into biting the combination hook and orientation device.

A fish hook is attached to the head orientation device at a slight upward angle. The fish hook is generally between ¾ to 2¼ in length or larger for larger fish but may be larger in some cases and contains a point below the shank of the fish hook. The fish hook penetrates the plastic bait, hiding the fish hook, and thus, enticing a fish to bite the combination hook and orientation device. When a fish bites the combination hook and orientation device, the hook penetrates the fish's lower lip. The bait eyelet and the line eyelet are both formed by a single wire threaded through the eyelet of the hook and cast within the lead body of the orientation device.

From the above description, it can be understood that the jig lure of this invention has several advantages, such as for example: (1) the point of the fish hook is covered by the bait, preventing the hook from becoming embedded into an undesirable object; (2) the placement of the hook is positioned so that the point of the hook is below the shank of the hook, thus positioning the point of the hook toward the lower portion of a fish's mouth, penetrating the lower lip of the fish, and not causing irrepairable damage to the fish as commonly happens when the point of the hook is above the shank of the hook; (3) survivability of a fish caught in a "catch and release" mode of fishing is increased since the fish is not injured due to the damage caused by the penetration of the hook into the upper lip; (4) it is exceptionally sturdy; and (5) it is economical to make.

SUMMARY OF THE DRAWINGS

The above and further features of the invention will be more fully understood from the following detailed description when considered with reference to the accompanying drawings in which.

DETAILED DESCRIPTION

Figure 1:
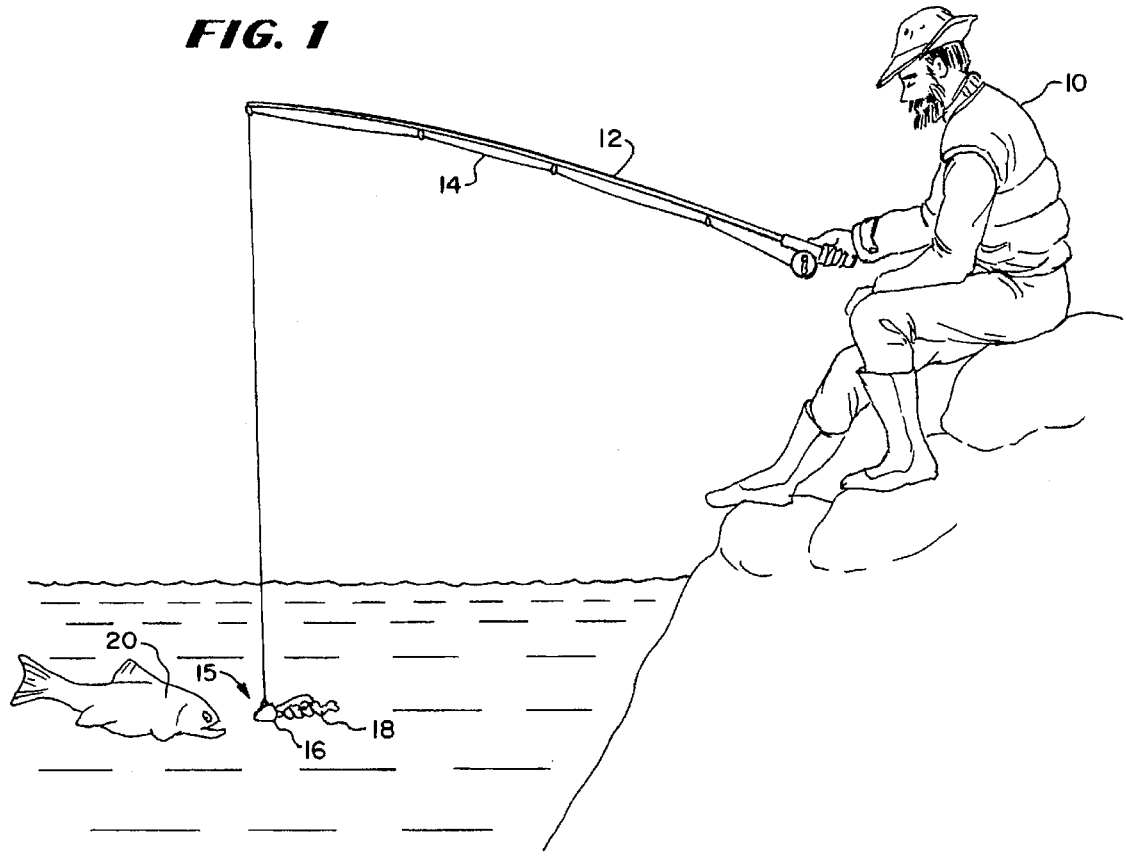
FIG. 1 is a simplified elevational view showing a fish lure in accordance with an embodiment of the invention in use.

In FIG. 1, there is shown a perspective view of a fisherman 10, a fishing rod 12, a fishing line 14, a fish lure 15 and a fish 20. The fish lure 15 includes a combination hook and orientation device 16 and a plastic bait 18. One end of the fishing line 14 is connected to the fish lure 15 and the other end of the fishing line 14 is connected to the fishing rod 12 to permit the fisherman 10 to use the rod to catch fish that may strike the fish lure 15. The fishing rod 12 and line 14 may be held by a fisherman 10 or may be connected to any other suitable means.

Figure 2:
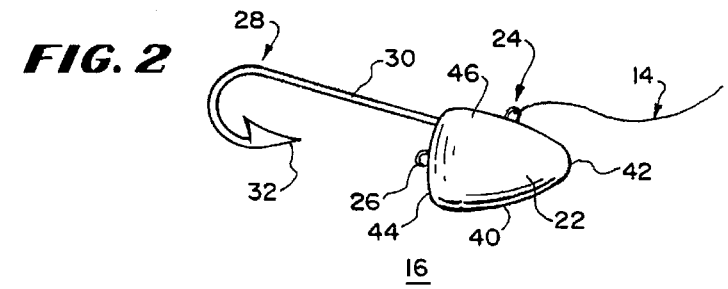
FIG. 2 is perspective view of the embodiment of FIG. 1.

As best shown in FIG. 2, the combination hook and orientation device 16 has a head 22, an eyelet means 24, a bait attachment mechanism 26 and one single-barb fish hook 28, all connected together to form one integral unit. The eyelet means 24 is connected to the fishing line 14 and the hook 28 includes a shank 30 and a point 32. The eyelet means 24 is located in the head 22 at a point slightly forward of the middle of the longitudinal axis of the fish lure and at the top surface so that the line 14 attached to it provides tension when pulled to orient the combination hook and orientation device 16 with the hook 28 trailing the head 22.

Figure 3:
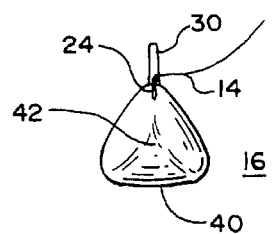
FIG. 3 is a front end elevational view of an embodiment of FIG. 2.

In FIG. 3, there is shown a front end elevational view of the combination hook and orientation device 16 shaped generally as a pyramid with its apex 42 facing forward, an eyelet 24 for the line 14 extending from its upper lateral corner or edge 46 (FIG. 2) intended as the top of the lure. This corner or edge 46 is intended to face the surface of the water as the lure is pulled by the line 14 so that the apex 42 of the pyramid leads the base of the pyramid with a narrow edge facing upwardly. A wide lateral surface 40 forms the bottom of the lure and the shank 30 of the hook 28 extends from the base 44 (FIG. 2) of the pyramid at a slight angle, less than 45 degrees to the base. A second eyelet 26 (FIG. 2) also extends from the base 44 below the hook 30. The eyelets 24 and 26 are formed of a single wire molded within the pyramid.

With this arrangement, the center of gravity of the head and the lure is lower than the shank of the hook 30 and the eyelet 24 because of the wide lateral surface 40 compared with the narrow upper edge 46. Thus the lure is oriented in the water with the hook positioned so that the point faces downwardly as the lure is pulled by the line 14. When jigging the longitudinal axis of the lure remains horizontal as the line 14 is moved vertically up and down.

Figure 4:
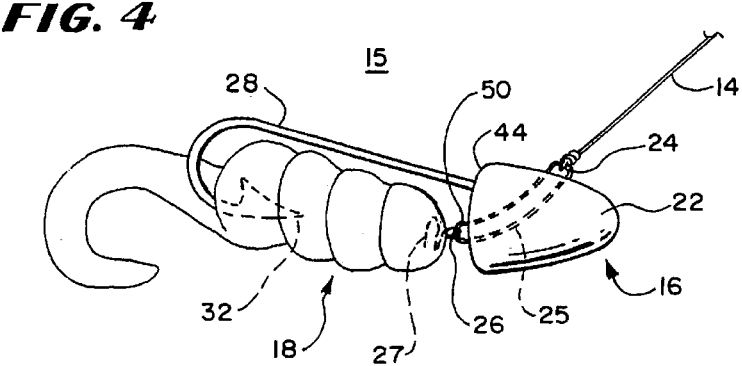
FIG. 4 is a side elevational view of the combination hook and orientation device in accordance with the embodiment of FIG.. 1.

In FIG. 4, there is shown an elevational view of the lure 15 with the combination hook and orientation device 16, line 14 and bait 18. The hook and orientation device 16 is shown with the lead pyramidal head 22, eyelet means 24 to attach fishing line 14, bait attachment mechanism 26 and a fish hook 28. As best shown in this view the eyelet means 24 is a loop of wire extending from the lead pyramid with the wire 25 of which the loop is a part passing through an eyelet 50 of the fish hook 28 and extending as a loop from the base 44 of the pyramidal head 22 to form the eyelet means 24. The bait attachment means 26 includes a portion adapted to engage the bait such as a screw 27 that is connected to the eyelet 26 and the bait 18. In the preferred embodiment it is a screw that extends into the bait but may also be a wire that surrounds the bait or any other fastener. The hook 28 extends into the bait 18.

Figure 5:
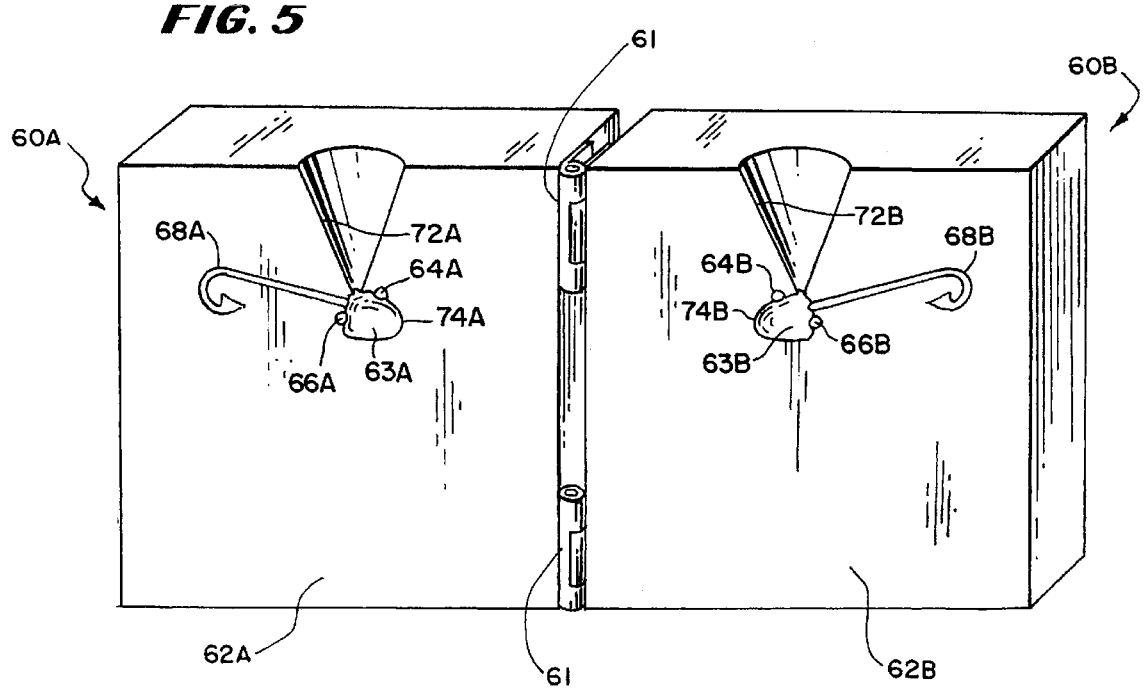
FIG. 5 is a simplified perspective view of a mold that may be used to make one portion of the embodiment of FIG. 4.

In FIG. 5, there is shown a simplified perspective view of a mold 60 that may be used to make the head 22 (head 22 not being shown in FIG. 5) having two cooperating parts 60A and 60B foldable together at hinges 61. Each part includes a respective one of corresponding halfs 62A and 62B each including a different half 63A and 63B of a generally pyramidal shaped cavity 63A and 63B with an open top or pour channel 72A, 72B, apex 74A, 74B and lateral edge wall 70A and 70B. An opening is provided at 64A, 64B for a wire loop a cavity 66A and 66B is formed in the base wall 62A and 62B for another loop of wire and an opening 68A, 68B is formed for the fish hook. The opening is closed by and sealed with wax.

To form the the combination hook and orientation device 16, the wire 25 is positioned in the generally pyramidal-shaped mold with a loop to form the eyelet means 24 (FIG. 4) on an edge near the apex of the mold and a loop to form the eyelet 26 (FIG. 4) extending through the opening 63A, 63B wall at the end of the mold opposite to the eyelet means 24, which end is the base of the pyramid. The hook 28 is positioned to extend from the base of the mold, with the point 32 of the hook being below the shank 30 of the hook 28 and with the wire 25 passing through the eyelet 50 of the hook 28. The mold 60 is filled with molten lead with the wire 25, loop forming the eyelets 24 and 26 and the hook 28 all in place. The lead is permitted to harden. With this arrangement, an effective jig lure is formed in a simple operation.

From the above description, it can be understood that the jig lure of this invention has several advantages, such as for example: (1) the point of the fish hook is covered by the bait, preventing the hook from becoming embedded into an undesirable object; (2) the placement of the hook is positioned so that the point of the hook is below the shank of the hook, thus positioning the point of the hook toward the lower portion of a fish's mouth, penetrating the lower lip of the fish, and not causing irrepairable damage to the fish as commonly happens when the point of the hook is above the shank of the hook; (3) survivability of a fish caught in a "catch and release" mode of fishing is increased since the fish is not injured due to the damage caused by the penetration of the hook into the upper lip; (4) it is exceptionally sturdy; and (5) it is economical to make.

While a preferred embodiment of the invention has been described with some particularity, many modifications and variations of the preferred embodiment are possible in light of the above teachings. Therefore it should be understood that, within the scope of the appended claims, the invention may be practiced other than as specifically described.

What is claimed is:

1. An apparatus comprising:
   a head orientation device having an upper side and a lower side;
   an eyelet to attach a fishing line;
   a bait attachment mechanism;
   a fish hook having a hook portion and a shank portion;
   said head orientation device being generally shaped as a pyramid having a base, an apex and lateral sides with means for attaching a fishing line near a center of one lateral edge of the pyramid on the upper side of the head orientation device; and
   the fish hook extending from the base of the pyramid near the one lateral edge with the hook portion below the shank portion.

2. Apparatus in accordance with claim 1 in which the pyramid has a rounded apex and rounded edges.

3. An apparatus in accordance with claim 2 in which said head orientation device is constructed of lead.

4. An apparatus in accordance with claim 1 including a fishing pole and a fishing line wherein said eyelet to attach a fishing line positioned near a center of a lateral edge of the head orientation device is attached to said fishing line and said fishing line is attached to the fishing pole.

5. An apparatus in accordance with claim 4 in which said eyelet is of sufficient size to thread a fishing line of 0.025" to 0.040" through the eyelet.

6. An apparatus in accordance with claim 1 wherein said pyramid base has a center side and, said bait attachment mechanism being positioned below the center of the base of the head orientation device but closer to the lower side than the upper side.

7. An apparatus in accordance with claim 6 wherein said attachment mechanism is adapted to have a plastic bait attached to it.

8. An apparatus in accordance with claim 1 wherein said pyramid base has a center; and, said fish hook protrudes from the base of the head orientation device closer to the upper side than to the lower side and at an upward angle.

9. An apparatus in accordance with claim 8 wherein said fish hook is between ¾" to 2¼" in length.

10. An apparatus further in accordance with claim 8 wherein said fish hook includes a straight shank portion; and, said hook portion having a point positioned below the shank portion of the fish hook.

11. An apparatus further in accordance with claim 8 including a plastic bait wherein said fish hook penetrates the plastic bait to resist hooking foreign objects.

* * * * *